United States Patent [19]

House et al.

[11] 4,439,333

[45] Mar. 27, 1984

[54] HEAVY BRINE VISCOSIFIERS

[75] Inventors: Roy F. House, Houston; Lonnie D. Hoover, Chappell Hill, both of Tex.

[73] Assignee: NL Industries, Inc., New York, N.Y.

[21] Appl. No.: 261,897

[22] Filed: May 8, 1981

[51] Int. Cl.$^3$ .............................. C09K 7/00; B01F 3/00
[52] U.S. Cl. ......................... 252/8.55 R; 252/8.5 C; 252/8.55 D; 252/363.5; 536/86; 536/87
[58] Field of Search ................... 252/8.55 R, 8.55 C, 252/363.5; 536/87, 88

[56] References Cited

U.S. PATENT DOCUMENTS 3,998,973 12/1976 Carlson ...................... 252/8.5 A X
4,330,414 5/1982 Hoover ...................... 252/8.5 C X
4,350,601 9/1982 Mosier ........................ 252/316 X

*Primary Examiner*—Benjamin R. Padgett
*Assistant Examiner*—Catherine S. Kilby
*Attorney, Agent, or Firm*—Browning, Bushman, Zamecki & Anderson

[57] ABSTRACT

Polymeric compositions for, and methods of, increasing the viscosity of aqueous brine well servicing fluids comprising adding to the brine a composition containing hydroxyethyl cellulose, a solid organic activating agent for the hydroxyethyl cellulose, and a solvent for the activating agent which also functions as a suspending medium or carrier for the hydroxyethyl cellulose.

5 Claims, No Drawings

HEAVY BRINE VISCOSIFIERS

BACKGROUND OF THE INVENTION

The present invention relates to compositions for use in viscosifying and decreasing the fluid loss in aqueous brine systems, to methods of increasing the viscosity and decreasing the fluid loss of aqueous brines, and to aqueous well servicing fluids prepared therefrom.

Thickened aqueous mediums, particularly those containing soluble salts, are commonly used as well servicing fluids such as drilling fluids, workover fluids, completion fluids, packer fluids, well treating fluids, subterranean formation treating fluids, spacer fluids, hole abandonment fluids, and other aqueous fluids in which an increase in viscosity is desired. It is known to use hydrophilic polymeric materials such as hydroxyethyl cellulose (HEC) and xanthan gums as thickening agents for aqueous mediums used in such well servicing fluids. However, such polymers are not readily hydrated, solvated or dispersed in certain aqueous systems without elevated temperatures and/or mixing under high shear for extended periods of time. For example, hydroxyethyl cellulose polymers are poorly hydrated, solvated or dispersed at ambient temperature in aqueous solutions containing one or more multivalent cation water soluble salts, such as heavy brines having a density greater than about 11.7 ppg. which are used in well servicing fluids. Other polymers such as xanthan gum require elevated temperatures in even lower density solutions. In many cases, as for example, in workover operations, the equipment available for preparing the well servicing fluids does not readily lend itself to high temperature mixing. In well servicing operations where a solids-free well servicing fluid is desired, such as certain completion operations, the fluid cannot be circulated in the hot borehole to increase the temperature of the fluid.

SUMMARY OF THE INVENTION

It is therefore, an object of this invention to provide new, polymeric compositions useful in viscosifying aqueous mediums, especially heavy brines having a density greater than about 11.7 pounds per gallon.

A further object of the present invention is to provide an improved aqueous well servicing fluid.

Another object of this invention is to provide a method of preparing well servicing fluids.

Still another object of the present invention is to provide a polymeric composition which can be used to form viscous brine well servicing fluids under conditions of low shear mixing without the addition of heat.

The above and other objects of the present invention will become apparent to one skilled in the art from the description given herein and the appended claims.

In accordance with the present invention there is provided a polymeric composition for use in viscosifying aqueous brine systems comprising hydroxyethyl cellulose (HEC), an activating agent, and a solvent for the activating agent which has no appreciable swelling effect on the HEC.

In another embodiment of this invention, the polymeric compositions described above can be admixed with an aqueous medium, such as, for example, a brine having a density greater than about 11.7 pounds per gallon (ppg.), to produce well servicing fluids, e.g., a workover or completion fluid.

In the method of this invention, the polymeric composition is admixed with an aqueous brine to form a well servicing fluid.

DESCRIPTION OF THE PREFERRED EMBODIMENTS

The polymeric compositions of the present invention utilize, as a hydrophilic polymer, HEC as the primary component to provide the thickening effect. The HEC polymers are solid, particulate materials which are water soluble or water dispersible and which upon solution or dispersion in an aqueous medium increase the viscosity of the system. HEC polymers are generally high yield, water soluble, non-ionic materials produced by treating cellulose with sodium hydroxide followed by reaction with ethylene oxide. Each anhydroglucose unit in the cellulose molecule has three reactive hydroxy groups. The average number of moles of the ethylene oxide that becomes attached to each anhydroglucose unit in cellulose is called moles of substituent combined. In general, the greater the degree of substitution, the greater the water solubility. In general, it is preferable to use HEC polymers having as high a mole substitution level as possible.

Usually, upon the addition of dry, powdered hydrophilic materials, such as HEC, to aqueous mediums such as brines, the polymer particles undergo hydration preventing the interior of the particle from readily hydrating, solvating or otherwise dispersing in the aqueous medium. Accordingly, high shear, long mixing times and/or elevated temperatures must be applied in order to obtain a homogeneous system. It is a feature of the present invention that the polymeric compositions of the present invention readily hydrate, dissolve or disperse in such aqueous mediums at relatively low shear and ambient temperature.

Although the amount of HEC in the polymeric composition can vary widely depending on the viscosity of the composition desired, generally the HEC will be present in amounts of from about 3 to about 40% by weight of the composition, preferably from about 10 to about 30% by weight, most preferably from about 15% to about 25% by weight. It is preferred that the polymeric composition be pourable. This can be achieved by adjusting the relative concentrations of the HEC and the activating agent, as the concentration of the activating agent must decrease in order to keep the viscosity constant, and vice versa.

The activating agents useful in the polymeric compositions of the present invention are solid organic chemicals which, when dissolved in an organic solvent as discussed hereinafter, will enable the HEC to hydrate or solubilize in brines having a density greater than about 13.0 ppg. at ambient temperatures. Preferred activating agents are phenol and substituted phenols wherein one to five substituent groups are present in the molecule, the substituent groups being selected from the group consisting of OH, $NH_2$, $NO_2$, Cl, Br, and mixtures thereof. The activating agent will be present in an amount from about 10% to about 40% by weight of the polymeric composition, preferably from about 15% to about 30%. Particularly preferred substituted phenols contain from 1 to 2 substituent groups selected from the group consisting of OH, $NH_2$, $NO_2$ and mixtures thereof. Non-limiting examples of suitable activating agents include phenols, pyrocatuhol, pyrogallol, p-nitrophenol, resorcinol, hydroquinone, etc.

In addition to the HEC and an activating agent, the polymeric compositions of the present invention contain a solvent for the activating agent which has no appreciable swelling effect on the HEC. It has been found preferable to employ water miscible or water soluble organic liquids which have a carbon to oxygen ratio of less than about 6 and more preferably less than about 5, and more preferably in the range from 2 to 4. Also, the water soluble organic liquid is preferably soluble or at least dispersible in an aqueous brine having a density of greater than about 11.7 ppg. (pounds per gallon). Non-limiting examples of typical organic liquids include isopropanol, 2-ethoxyethanol, 2-butoxyethanol, 2-isopropoxyethanol, n-butanol, secbutanol, n-pentanol, and mixtures of the above and similar compounds. Specially preferred as the organic liquid is isopropanol (IPA). The organic liquid will generally be present in the polymeric composition in an amount of at least about 40% by weight and more preferably, from about 50 to about 70% by weight of the polymeric composition. The amout of solvent must be sufficient to dissolve the amount of activating agent necessary to activate the HEC. A test to determine the swelling effect of a solvent on the HEC has been devised as follows: one (1) part by weight of HEC is spatulated with two (2) parts by weight of the solvent. This mixture is allowed to set for one (1) week at room temperature (72° F.) in a sealed container. Liquids useful in the polymeric compositions of this invention will have free liquid present in the mixture after the one week period. Liquids which swell the HEC appreciably will have no free liquid present and are unsuitable in this invention. However, minor amounts of water soluble organic liquids which have a swelling effect on HEC, such as ethylene glycol and glycerol, may be incorporated into the polymeric compositions. The concentration of such swelling liquids will generally be less than about 20% by weight of the polymeric composition.

The polymeric compositions may contain suspension additives to reduce syneresis and setting. The suspension additive should be non-reactive with the HEC, the activating agent, or the solvent, non-limiting examples of such inert suspension additives include fumed silica, organophilic clays, and polymers such as hydroxpropyl cellulose.

In the preparation of the polymeric compositions, it is preferred to dissolve the activating agent of the solvent before addition of the HEC. After addition of the HEC, the composition gradually thickens as the HEC is swollen by the activating agent. Preferably the composition is stirred or mixed periodically to homogeneously suspend the swollen HEC in the solvent.

It has been found that if the polymeric compositions or thickeners are aged before being added to heavy brines, the hydration rate in such brines is increased. Accordingly, although the polymer compositions or thickeners may be added to the heavy brines within several hours of their preparation and in some cases immediately, longer aging times increase the rate at which the thickeners hydrate in the heavy brines.

While the polymeric compositions of the present invention are useful as thickeners or suspending agents in suspension fertilizers, liquid pesticides, liquid herbicides, and other aqueous systems which require viscosity enhancement, they are particularly useful in the preparation of well servicing fluids and, more particularly, well servicing fluids made from aqueous brines containing soluble salts such as, for example, a soluble salt of an alkali metal, an alkaline earth metal, a Group Ib metal, a Group IIb metal, as well as water soluble salts of ammonia and other cations. The thickener compositions are particularly useful in the preparation of thickened heavy brines, i.e. aqueous solutions of soluble salts of multivalent cations, e.g. Zn and Ca.

The most preferred thickened heavy brines, particularly those used for well servicing fluids, are made from brines having a density greater than about 11.7 pounds per gallon (ppg.). Especially preferred heavy brines are those having a density of from about 13.0 to about 19.2 ppg. which can comprise water solutions of a salt selected from the group consisting of calcium chloride, calcium bromide, zinc chloride, zinc bromide, and mixtures thereof.

As disclosed in copending patent application Ser. No. 161,444 filed June 20, 1980, entitled THICKENED HEAVY BRINES, incorporated herein by reference, HEC will not hydrate in and efficiently viscosify brines containing zinc bromide unless the concentration of zinc bromide is at least about 20% by weight. We have found, however, that HEC will produce low fluid loss, lower viscosity characteristics in solutions which have a zinc bromide concentration within the range from about 16% to about 20%, preferably 18% to 20% by weight. Thus such solutions will have utility where low viscosity, low fluid loss well servicing fluids are needed. Such brines can be readily prepared at ambient temperatures using the polymeric compositions of this invention.

In formulating well servicing fluids from heavy brines, it is preferred that the polymeric composition be admixed with the aqueous brine so as to provide an HEC concentration in the well servicing fluid of from about 1 to about 5 pounds per barrel (ppb.).

To more fully illustrate the present invention, the following non-limiting examples are presented. Unless otherwise indicated, all physical property measurements were made in accordance with testing procedures set forth in STANDARD PROCEDURE FOR TESTING DRILLING FLUID API RP 13B, Seventh Edition, April, 1978.

EXAMPLE 1

Activated compositions of NATROSOL 250HHR (Trademark of an HEC marketed by Hercules Co.) and NATROSOL 250HHW were prepared as follows: 20 parts by weight of the HEC were mixed with 80 parts by weight of a solution containing 20 parts by weight of an activating agent and 60 parts by weight of isopropyl alcohol. The samples were statically aged ten days to enable the activating agent to interact with the HEC.

The samples were evaluated at a concentration of 7.5 ppb. activated compositions (1.5 ppb. HEC) in a 16.0 ppg. $CaBr_2/ZnBr_2$ brine by mixing the sample and brine for five minutes on a Multimixer and 55 minutes at 300 rpm on a Fann viscometer. After obtaining the viscosities, the brines were rolled for 16 hours at 150° F., cooled to room temperatures, and the viscosities again obtained. The data obtained are given in Table 1. The 16.0 ppg. brine was prepared by mixing together 26% by volume of a 19.2 ppg. $CaBr_2/ZnBr_2$ brine (57% $ZnBr_2$, 20% $CaBr_2$, 23% water, by weight) and 74% by volume of a 14.2 ppg. $CaBr_2$ brine (53% $CaBr_2$, 47% water, by weight).

TABLE 1

| HEC | Activating Agent | API RP 13B Rheology | | | |
|---|---|---|---|---|---|
| | | 1 Hour @ 74° F. | | Rolled @ 150° F., 16 Hours | |
| | | 600 rpm | 300 rpm | 600 rpm | 300 rpm |
| NATROSOL 250HHR | Phenol | 108 | 72 | 155 | 113 |
| NATROSOL 250HHR | Pyrocatechol | 125 | 84 | 159 | 113 |
| NATROSOL 250HHW | Phenol | 158 | 108 | 169 | 125 |
| NATROSOL 250HHW | Pyrocatechol | 159 | 110 | 170 | 121 |

EXAMPLE 2

The activated compositions of Example 1 containing 20% NATROSOL 250HHW, 20% phenol and 60% isopropyl alcohol was evaluated in the 19.2 ppg. brine and the 14.2 ppg. brine using the procedure of Example 1. The data obtained are given in Table 2.

TABLE 2

| Brine ppg | API RP 13B Rheology | | | |
|---|---|---|---|---|
| | 1 Hour @ 74° F. | | Rolled @ 150° F., 16 Hours | |
| | 600 rpm | 300 rpm | 600 rpm | 300 rpm |
| 19.2 | 293 | 203 | 300 | 217 |
| 14.2 | 147 | 105 | 140 | 118 |

EXAMPLE 3

Activated compositions of NATROSOL 250HHR was prepared by mixing together 20 parts by weight of this HEC with 80 parts by weight of a solution containing 20 parts by weight of an activating agent and 60 parts by weight of isopropyl alcohol. The compositions were aged for 24 hours with periodic mixing. Thereafter, the compositions were evaluated as in Example 1. The data obtained are given in Table 3.

TABLE 3

| Activating Agent | API RP 13B Rheology | | | |
|---|---|---|---|---|
| | 1 Hour @ 74° F. | | Heated @ 150° F. | |
| | 600 rpm | 300 rpm | 600 rpm | 300 rpm |
| Pyrogallol | 133 | 90 | 167 | 120 |
| p-Nitrophenol | 109 | 73 | 150 | 107 |

EXAMPLE 4

An activated composition of NATROSOL 250HHW was prepared by mixing together 20 parts by weight of this HEC with 80 parts by weight of a solution containing 20 parts by weight of an activating agent and 60 parts by weight of isopropanol. The compositions were aged 96 hours. Thereafter, the compositions were evaluated as per Example 1. The data obtained are given in Table 4.

TABLE 4

| Activating Agent | API RP 13B Rheology | | | |
|---|---|---|---|---|
| | 1 Hour @ 74° F. | | Heated @ 150° F. | |
| | 600 rpm | 300 rpm | 600 rpm | 300 rpm |
| Resorcinol | 151 | 101 | 154 | 113 |
| Hydroquinone | 135 | 91 | 150 | 108 |

The invention may be embodied in other specific forms without departing from the spirit or essential characteristics thereof. The present embodiments are therefore to be considered, in all respects as illustrative and not restrictive, the scope of the invention being indicated by the appended claims rather than by the foregoing description, and all changes which come within the meaning and range of equivalence of the claims are therefore intended to be embraced therein.

We claim:

1. A polymeric composition useful for viscosifying aqueous brines at ambient temperature which comprises:
   (a) from about 10% to about 30% by weight hydroxyethyl cellulose;
   (b) from about 10% to about 40% by weight of a solid organic activating agent selected from the group consisting of phenol and substituted phenols wherein from 1 to 5 substituent groups are present in the molecule, the substituent groups being selected from the group consisting of OH, $NH_2$, $NO_2$, Cl, Br, and mixtures thereof; and
   (c) an organic solvent for said activating agent which has no appreciable swelling effect on the hydroxyethyl cellulose.

2. The composition of claim 1 wherein said organic solvent is water soluble and wherein said organic solvent, when uniformly mixed with said hydroxyethyl cellulose in a weight ratio of hydroxyethyl cellulose to organic solvent of 1:2, produces a mixture with free solvent present after remaining quiescent for one week at ambient temperature in a sealed container.

3. The composition of claim 1 wherein the concentration of said hydroxyethyl cellulose is from about 15% to about 25%, the concentration of said activating agent is from about 15% to about 30%, and wherein the concentration of said organic solvent is from about 50% to about 70% by weight of said composition.

4. A clear brine well servicing fluid having a density in the range from about 13.0 ppg. to about 19.2 ppg. containing a soluble salt selected from the group consisting of calcium chloride, calcium bromide, zinc bromide and mixtures thereof, and a viscosity increasing amount of a polymeric composition of any of claims 1, 2 or 3.

5. A method of increasing the viscosity of an aqueous brine which comprises adding to the brine a viscosifying amount of polymeric composition of any of claim 1, 2 or 3.

* * * * *